Nov. 23, 1965    P. VILLEPLE ETAL    3,219,161
VEHICLE TRANSMISSION AND CLUTCH MECHANISM
Filed Oct. 10, 1963    4 Sheets-Sheet 1
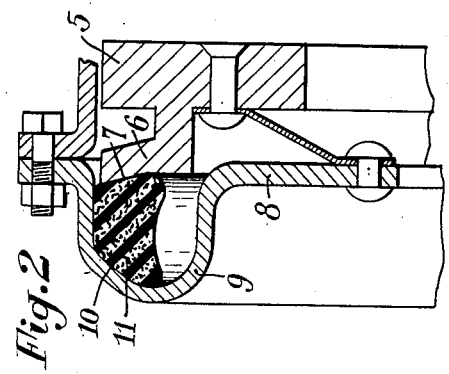
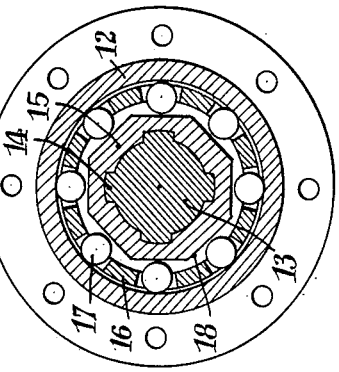
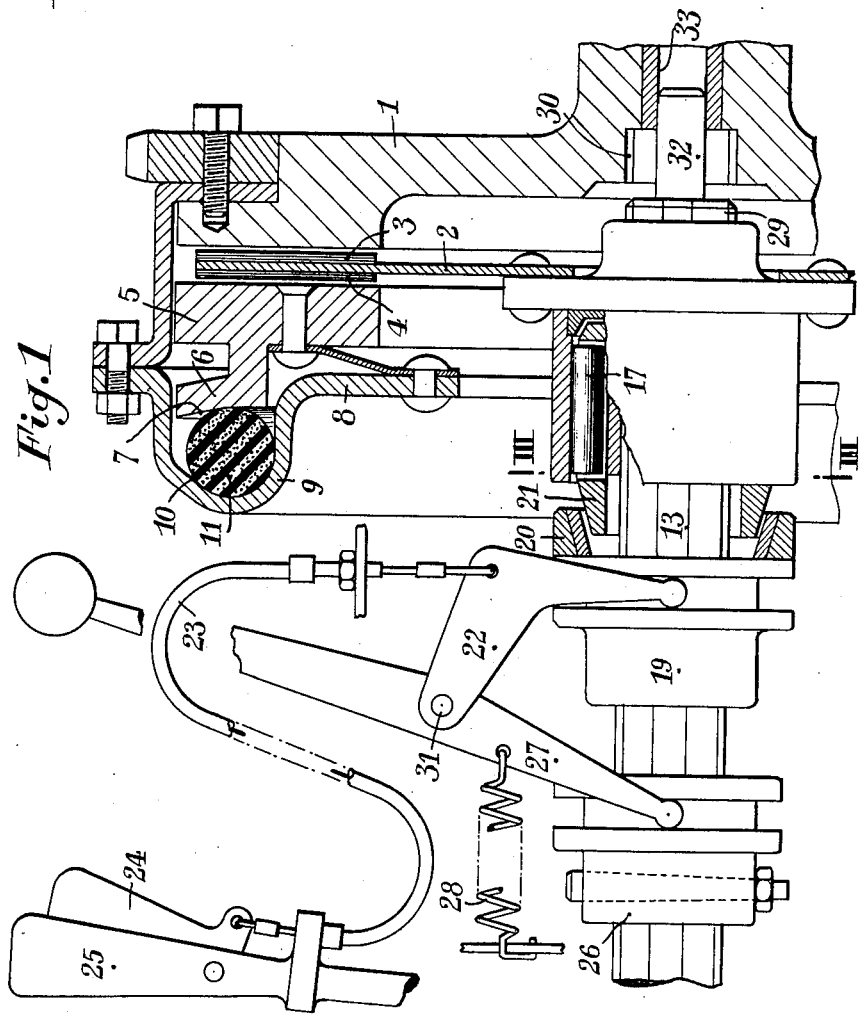

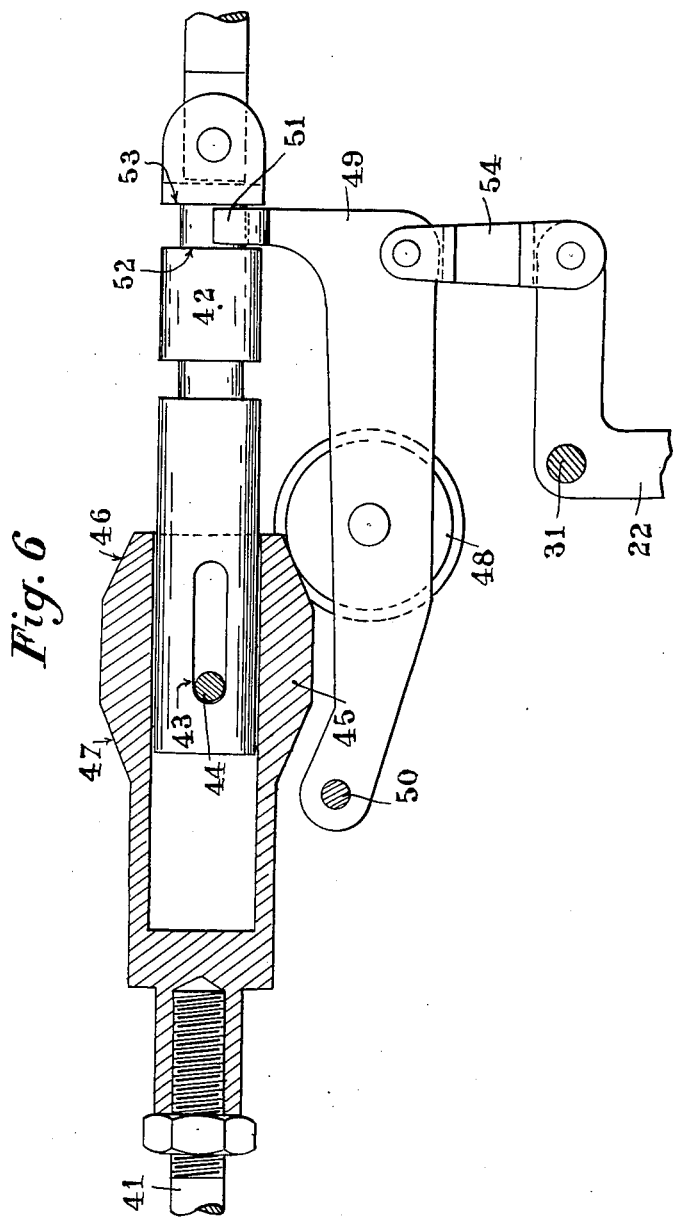

United States Patent Office 3,219,161
Patented Nov. 23, 1965

3,219,161
VEHICLE TRANSMISSION AND CLUTCH
MECHANISM
Paul Villeple, 70 Rue Nollet, Paris, France, and Michel
Billot, 124 Blvd. de la Republique, Saint-Cloud, Seine-
et-Oise, France
Filed Oct. 10, 1963, Ser. No. 315,173
Claims priority, application France, Oct. 10, 1962,
911,806, Patent 1,352,148; Sept. 24, 1963, 948,479,
Patent 84,381
4 Claims. (Cl. 192—3.5)

This invention relates in general to vehicle drives and has specific reference to a vehicle driving mechanism adapted to be inserted between the engine flywheel of the vehicle and its change-speed gear, this vehicle driving mechanism being characterized in that it comprises the mounting in series of a centrifugal clutch and of a wedge-type driving device operating normally in either direction of rotation, with means for locking said driving device in an intermediate freewheel position.

The centrifugal clutch may consist of an annular member made of adequate elastomer or like material such as a glass-wool braid, which is preferably ballasted with a heavier material such as lead granules or glass balls, interposed between two inclined faces converging outwardly, said inclined faces being rigid the one with the flywheel and the other with a member rotatably driven from said flywheel but adapted to perform a slight transverse movement in relation thereto, said last-named member constituting the movable plate of a clutch.

According to a preferred variation of this invention said centrifugal clutch consists of an annular member made from elastomer material which has its inner face engaged by a set of inertia weights of adequate metal such as lead which, under the influence of centrifugal force, compress said annular member and cause its distortion, whereby said annular member engages the movable clutch plate and produces the desired clutch engagement.

A ring of heat-insulating material is interposed preferably between the movable clutch plate and the resilient annular member to prevent the transfer of heat from the clutch to said resilient annular member.

The wedge-type driving device operating normally in either direction of rotation may consist of a cylindrical outer annulus rotatably rigid with the intermediate clutch plate and with a central, polygonal-sectioned shaft rigid with the driven shaft, an intermediate cage maintaining the relative spacing of the longitudinal rollers adapted to cooperate each with one of the inclined faces of the polygonal central shaft; thus, according as the relative movement between said polygonal central shaft and the outer cylindrical annulus takes place in one or the opposite direction, the rollers are wedged between these two members either in one or in the other direction; the means for locking this driving device in the intermediate freewheel position may consist of a member rotatably driven with said polygonal shaft and adapted to slide axially in relation thereto in order to lock said intermediate cage in such a position that the rollers are wedged neither in one nor in the other direction and that, consequently, the external cylindrical ring revolves freely in relation to the polygonal central shaft.

According to a specific form of embodiment of the mechanism of this invention, instead of locking the driving device by wedging same in its intermediate or freewheel position by means of a special control comprising a hand lever pivotally mounted on the gear shift lever, which the driver must actuate specially when gripping this lever, a device is provided whereby the actuation of the change-speed lever causes the driving device to be locked automatically in its freewheel position, before the gear shift operation proper, which may thus take place without difficulty.

According to a specific form of embodiment, the shaft controlling the selector of the change-speed gear is provided with cam faces cooperating with a cam member the movement of which produces the desired locking action if desired with the interposition of levers.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

Other objects and advantages will become apparent from the following description taken in conjunction with the accompanying drawings in which:

FIGURE 1 is a complete diagrammatic view of the driving mechanism in its disengaged position;

FIGURE 2 is a fragmentary view showing the centrifugal clutch in its engaged position;

FIGURE 3 is a section taken upon the line III—III of FIG. 1;

FIGURE 6 shows a detail.

Figure 4:
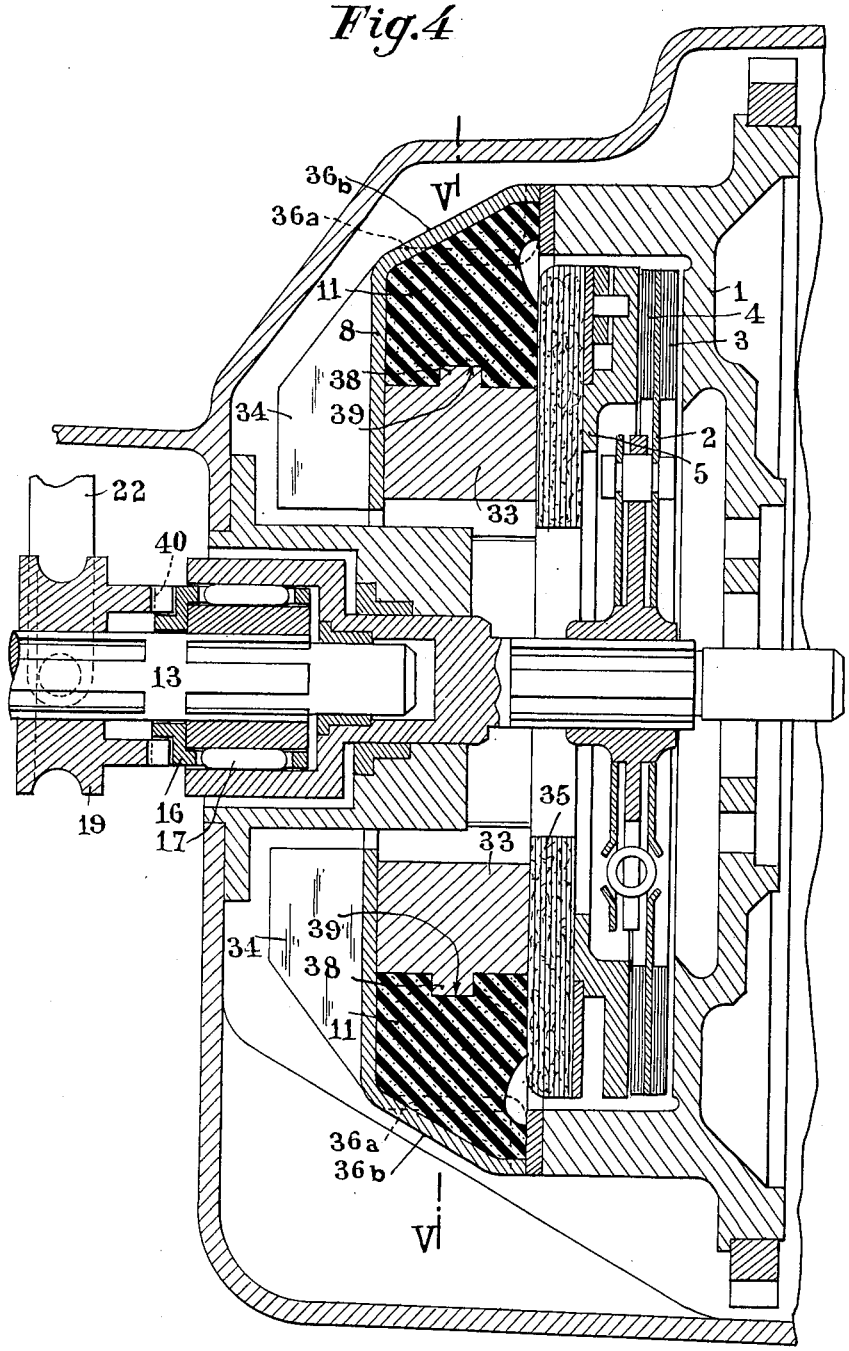
FIGURE 4 is a longitudinal section showing a modified form of the invention in its disengaged position.

The centrifugal clutch illustrated in the drawings comprises a flywheel constituting the fixed plate 1 of a clutch rotatably driven in any suitable and known manner from the engine of the vehicle, an intermediate plate 2 carrying the clutch linings 3, 4 and a movable plate 5; this movable plate 5 is formed with an integral annular portion 6 having an inclined face 7. Another annular member 8 rotatably solid with the movable plate 5 but adapted to perform slight relative longitudinal movements is formed near its outer periphery with a concave portion 9 having an inclined surface 10; furthermore, an annular member 11 made from a suitable elastomer and ballasted with lead granules or the like is disposed in the concave portion 9 of annular member 8, between the two inclined faces 7 and 10.

It is clear that when the flywheel 1 is rotatably driven at the same time as the annular member 8 and the movable clutch plate 5, the resilient annulus 11 subjected to the centrifugal force undergoes a certain amount of distortion and slides outwards in contact with the inclined faces 7 and 10, as shown with a certain exaggeration in FIG. 2; and that this resilient annulus 11 will thus exert a certain pressure on the annular portion 6 of the movable plate 5, this pressure being transmitted by the plate 5 to the intermediate plate 2, whereby the clutch linings 3, 4 are clamped between this movable plate 5 and the fixed plate 1 and provide the desired clutch engagement.

A cylindrical member 12 is rotatably solid with the intermediate plate 2 secured thereon; within this cylindrical member 12, on the driven shaft 13 formed with splines 14, a polygonal-sectional member 15 is wedged; between the cylindrical member 12 and the polygonal-sectioned member 15 an intermediate cage 16 holds a set of longitudinal rollers 17 adapted to engage the various inclined faces 18 of the aforesaid polygonal-sectioned member 15; when the flywheel 1, intermediate plate 2 and cylindrical member 12 are rotatably driven from the engine, said cylindrical member 12 will firstly drive at least the lower rollers 17 and subsequently, through the cage 16, all the rollers 17 which become wedged against the inclined faces 18 of the polygonal-sectioned member 15, whereby the shaft 13 is driven positively by the member 15; if the engine ceases from driving the vehicle it is the driven shaft 13 that drives the polygonal-sectioned member 15 wedging the rollers 17 against the cylindrical member 12 driven in turn from the driven shaft 13.

Under these conditions, a positive drive is obtained in one or the other direction according as the wheels are driven from or braked by the engine (coasting).

With this device, when the engine is idling the resilient annular member 11 and the centrifugal clutch are in the position shown in FIG. 1 and therefore the intermediate clutch plate 2 is not driven from the flywheel 1; thus, the transmission gears can be operated as desired, for example by engaging the lowest speed.

If the driver accelerates the engine, the resilient annulus 11 is forced outwards by the centrifugal force, as shown in FIG. 2, and the centrifugal clutch is engaged, the linings 3, 4 of the intermediate plate 2 are clamped between the fixed plate 1 and the movable plate 5, and the aforesaid intermediate plate carries along the cylindrical member 12 driving in turn through the rollers 17 the polygonal-sectioned member 15 and the splined shaft 13.

However, with this arrangement the clutch is disengaged only if the engine shaft and the driven shaft revolve both at idling speeds, and therefore any speed change is very difficult. To avoid this inconvenience a sliding hub 19 is provided which is rotatably driven from, and slidably mounted on, the splined shaft 13, so that said hub 19 may lock the cage 16 in an intermediate position in which the roller 17 are not wedged by the side faces 18 of the polygonal-sectioned member 15; to this end the sliding hub 19 carries a female cone element 20 adapted to engage a corresponding male cone element 21 rigid with the cage 16. The sliding movement of hub 19 may be controlled for example by means of a lever 22 fulcrumed at 31 and attached to one end of a Bowden cable 23 having its other end anchored to pivoting handle 24 mounted on the upper portion of the gear shift lever 25; thus, when the driver grips the gear lever 25 he automatically depresses the handle 24 and locks the cage 16 in a neutral position whereby the driving device between the cylindrical member 12 and the polygonal-sectioned member 15 is converted into a freewheel device; under these conditions the gears can be shifted without any difficulty.

To permit the starting of the engine by pushing or hauling the vehicle, and therefore by rotatiing the splined shaft 13, this shaft is slidably mounted in relation to the flywheel 1 and a member 26 wedged on this splined shaft 13 permits, by means of a lever 27 fulcrumed at 31 of sliding said member 26 and said splined shaft 13 so that the clutch teeth of its front end 29 engages the clutch teeth in a corresponding axial bore 30 formed in the flywheel 1 and causes this flywheel 1 to rotate bodily with the splined shaft 13; a traction spring 28 returns the lever 27 to its neutral position, and a cylindrical extension 32 of the splined shafts which engages a corresponding bore 33 of flywheel 1 ensures a perfect relative alignment of these two members.

Besides, it is clear that the form of embodiment of the invention which is described hereinabove with reference to the accompanying drawings is given by way of example only and should not be construed as limiting the scope of the invention as many modifications and variations may be brought thereto without departing form the basic principles of the invention.

Figure 5:
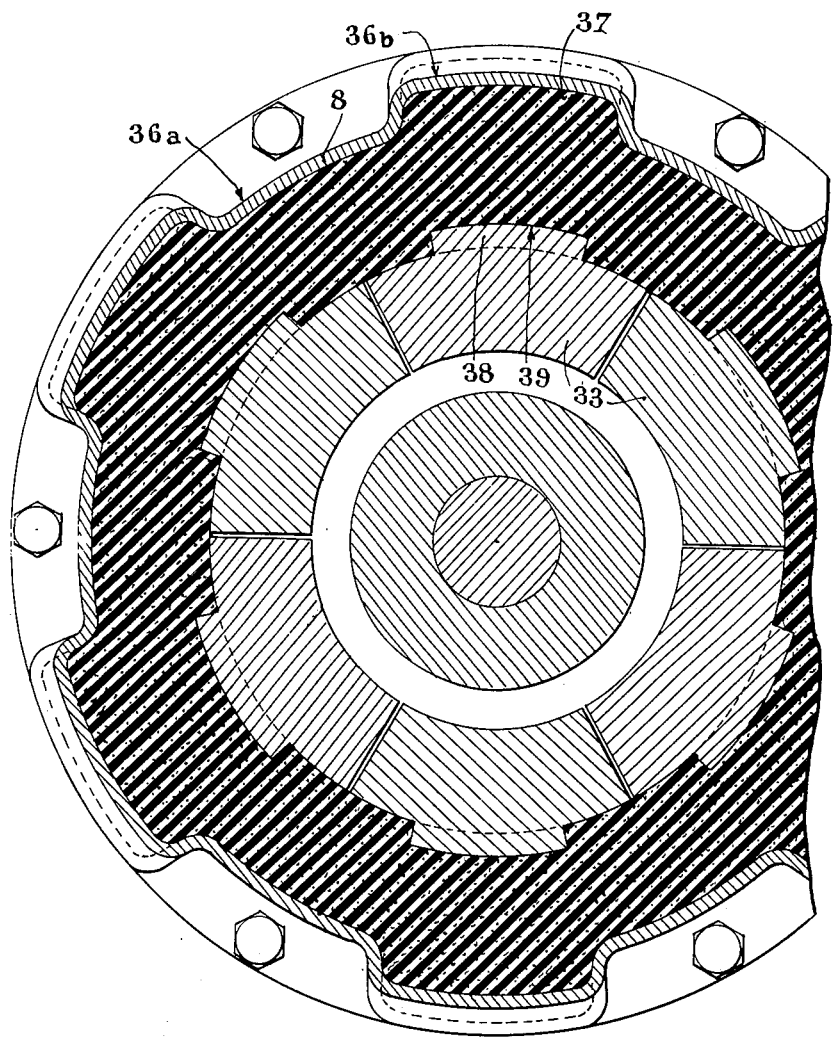
FIGURE 5 is a cross-sectional view taken upon the line V—V of FIG. 4.

Thus, notably, in the alternate form of embodiment illustrated, in FIGS. 4 and 5, the flywheel 1 is rotatably rigid with the annular member 8 formed with integral cooling fins 34 and adapted to receive in its outer inner portion the resilient annular member 11; moreover, inertia weights 33 of relatively heavy metal such as lead or cast-iron are disposed radially inside the resilient member 11 so that the centrifugal force developed by the rotation of the assembly will urge these weights outwards to compress the resilient annular member 11; now since this member 11 can expand only in the direction of the movable plate 5 it will push the latter in the clutch-engaging direction through the medium of a ring 35 of heat-insulating material, such as asbestos, to prevent the heat developed during the clutch operation from being transferred to the resilient annular member 11.

In order to improve the relative coupling or driving engagement between the annulus 8 and the resilient annular member 11, these elements are formed with alternate radial projections and recesses, as shown in FIG. 5; thus, portions 36a of minor diameter are formed on the annulus 8, and the resilient annular member 11 comprises projecting portions 37 fitting in portions 36b of major diameter of said annulus 8.

Similarly, the relative coupling or driving engagement between the inertia weights 33 and resilient annular member 11 may be improved by forming on the outer faces of the inertia weights a plurality of heels 38 fitting in corresopnding recesses 39 formed in the inner periphery of the resilient annular member 11.

In this example (see FIG. 4) the wedge-type driving device is locked in its free wheel position by means of a dog clutch 40 disposed between the cage 16 of rollers 17 and the sliding hub 19 rotatably solid with the splined shaft 13; the sliding movement of this hub 19, which causes the dog clutch engagement and locks the cage 16 in the freewheel position, may be controlled as in the preceding case by means of a lever 22.

In the form of embodiment illustrated in FIG. 6 the shaft controlling the change-speed gear selector consists, according to the known construction, of two sections 41, 42 rotatably solid but adapted to slide axially within a limited extent in relation to each other due to the provision of a longitudinal slot 43 engaged by a transverse pin 44 rigid with a socket 45 constituting the extension of the aforesaid selector control shaft.

At either end the outer surface of this socket 45 is formed with cam faces or ramps 46, 47 engageable by a cam follower comprising a roller 48 rotatably mounted on a lever 49 fulcrumed about a pivot pin 50 and formed with a forked end 51 engaging a groove formed in the section 42 of the selector control shaft to prevent any sliding movement thereof.

When a gear shift is being made the section 41 of the selector control shaft slides firstly alone and one of the cam faces 46 or 47 acting upon the roller 48 causes the lever 49 to pivot about the fulcrum 50 whereby the fork 51 moves away from the faces 52 and 53 of the groove, thus releasing the portion 42 of the selector shaft which can thus slide in turn.

However, before this release the pivotal movement of lever 49 caused through the medium of a connecting link 54 the rotation of lever 22 about the pin 31, thus producing the driving engagement between the sliding hub 19 and the cage 16, and therefore the locking of the wedge-type driving device in its freewheel position.

What we claim is:

1. A vehicle driving mechanism adapted to be interposed between the flywheel of the vehicle engine and the input shaft of its transmission gears, which comprises a centrifugal clutch having a driving portion rotatably solid with the engine flywheel and a driven portion, a wedge-type driving device operating normally in either direction of rotation so as to lock the driven portion of the centrifugal clutch with the input shaft of the transmission gears, and means for locking said wedge-type driving device in an intermediate freewheel position so as to allow the transmission gears to be actuated without difficulty said centrifugal clutch consisting of an annular member made of an elastomer or other suitable material, ballasted by means of a heavy material such as lead granules or the like, two faces between which said resilient annular member is interposed, said faces being rigid the one with the engine flywheel and the other with a member rotatably driven from said flywheel but adapted to perform a slight relative longitudinal movement in relation thereto, which produces the clutch engagement when the centrifugal force is exerted on said resilient annular member.

2. A vehicle driving mechanism adapted to be interposed between the flywheel of the vehicle engine and the input shaft of its transmission gears, which comprises a centrifugal clutch having a driving portion rotatably solid with the engine flywheel and a driven portion, a wedge-type driving device operating normally in either direction of rotation so as to lock the driven portion of the centrifugal clutch with the input shaft of the transmission gears, and means for locking said wedge-type driving device in an intermediate freewheel position, said centrifugal clutch consisting of an annular member made from a suitable elastomer, of inertia weights of heavy metal such as lead bearing against the inner face of said annular member, and of two faces between which said resilient annular member and said inertia weights are interposed, said faces being rigid the one with the engine flywheel and the other with a member rotatably driven from said flywheel but adapted to perform a slight relative longitudinal movement in relation thereto which produces the clutch engagement when the centrifugal force is exerted on said resilient annular member and on said inertia weights which, under the influence of the centrifugal force, compresses said elastomer member and causes its distortion to produce the desired clutch engagement.

3. A vehicle driving mechanism adapted to be interposed between the flywheel of the vehicle engine and the input shaft of its transmission gears, which comprises a centrifugal clutch having a driving portion rotatably solid with the engine flywheel and a driven portion, a wedge-type driving device operating normally in either direction of rotation, which is adapted to lock the driven portion of the centrifugal clutch with the input shaft of the transmission gears, means for locking said driving device in an intermediate freewheel position and means by which the operation of the transmission gears acts on the means for locking said driving device in an intermediate freewheel position so as to automatically lock said wedge-type driving device in its freewheel position, before the actual speed change, which can thus be performed without difficulty.

4. A mechanism as set forth in claim 3, wherein the transmission gears comprise a shaft controlling the operation of the transminsion gears formed with cam faces, and a cam follower, engaging said cam faces, said cam follower acting in turn upon said means for locking said driving device in said intermediate freewheel position at the beginning of the operation of the transmission gears, before the actual speed change.

References Cited by the Examiner
UNITED STATES PATENTS

| | | | |
|---|---|---|---|
| 1,957,500 | 5/1934 | Harris et al. | 192—48 |
| 1,985,127 | 12/1934 | Wemp | 192—48 |
| 2,001,668 | 5/1935 | Maier | 192—48 |
| 2,005,250 | 6/1935 | Wemp | 192—48 |
| 2,009,914 | 7/1935 | Brown | 192—48 |
| 2,087,643 | 7/1937 | Gillett | 192—3.5 |
| 2,210,416 | 8/1940 | Kiep et al. | 192—105 X |
| 2,409,757 | 10/1946 | Hetzel et al. | 192—105 |
| 2,682,942 | 7/1954 | Thunstrom et al. | 192—48 |
| 2,976,975 | 3/1961 | Thostenson et al. | 192—105 |
| 2,987,158 | 6/1961 | Kiekhaefer | 192—105 |

FOREIGN PATENTS 1,164,423  10/1958  France.

DON A. WAITE, *Primary Examiner.*

DAVID J. WILLIAMOWSKY, *Examiner.*